United States Patent
Ellingson

[11] 3,922,811
[45] Dec. 2, 1975

[54] FISHING LURE
[76] Inventor: Elmer M. Ellingson, Buford, N. Dak. 58837
[22] Filed: Apr. 19, 1974
[21] Appl. No.: 462,377

[52] U.S. Cl. ............... 43/42.39; 43/42.02; 43/42.1
[51] Int. Cl.² ........................................ A01K 85/00
[58] Field of Search ............ 43/42.39, 42.37, 42.02, 43/42.45, 42.41, 42.48, 42.53, 42.47, 42.38, 42.1, 42.34, 22.32

[56]         References Cited
         UNITED STATES PATENTS
2,333,590   11/1943   Schueller .............................. 43/46
2,605,577   8/1952    Waugler ............................ 43/43.13
2,605,577   8/1952    Waugler ............................ 43/43.13
2,820,314   1/1958    Scott .................................. 43/42.1
3,271,892   9/1966    Sabrsola ........................... 43/42.47

Primary Examiner—Louis G. Mancene
Assistant Examiner—Peter K. Skiff

[57]             ABSTRACT
A fishing lure has three separate and distinct motions, namely-a long downward swimming stroke; a feeding motion whereby the lure darts upwardly toward the rear and then swims forward, often in a new direction; and a level swimming stroke whereby the lure turns to follow head first in the direction of movement of the fishing line as the line is moved slowly from side to side from above the surface of the water. The lure is in the shape of a small bait fish and includes tail fins, side fins and a dorsal fin. The fishing line is attached near the rear of the dorsal fin and a balancing weight is embedded forwardly of this point of attachment and toward the bottom of the fish body. A single fish hook is situated to extend upwardly through the head of the lure and curves backwardly therefrom. The tail fins are swept down and side fins are swept up toward the rear so that a mild rapid upward movement of the fish line will cause the lure to dart backward and upward. The same positioning of the side fins and the tail fins and the location of the weight causes the lure, when free, to glide along a long, flat, downward path simulating a long swimming action. The balance of the parts are such that the movement of the fish line from above the surface of the water will cause the lure to move in a substantially straight line through the water in head first direction.

5 Claims, 4 Drawing Figures

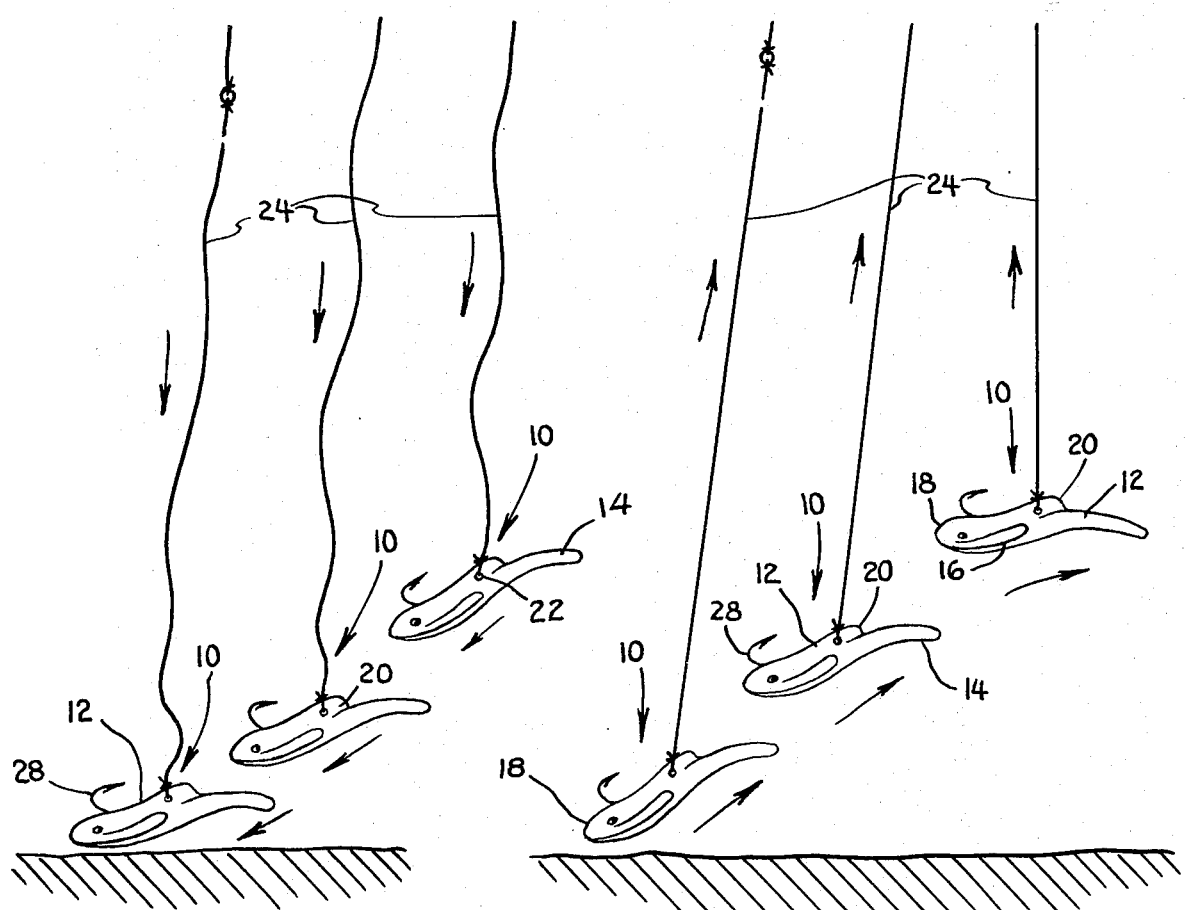
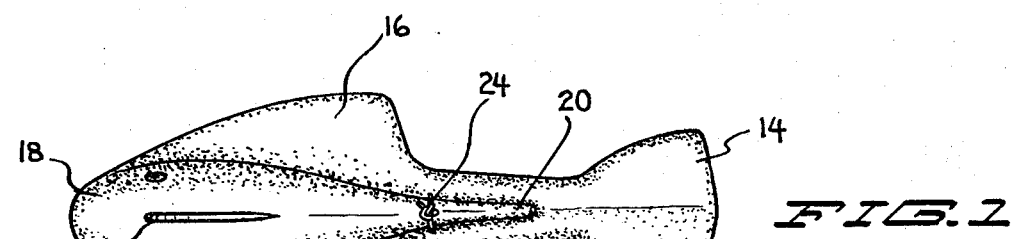
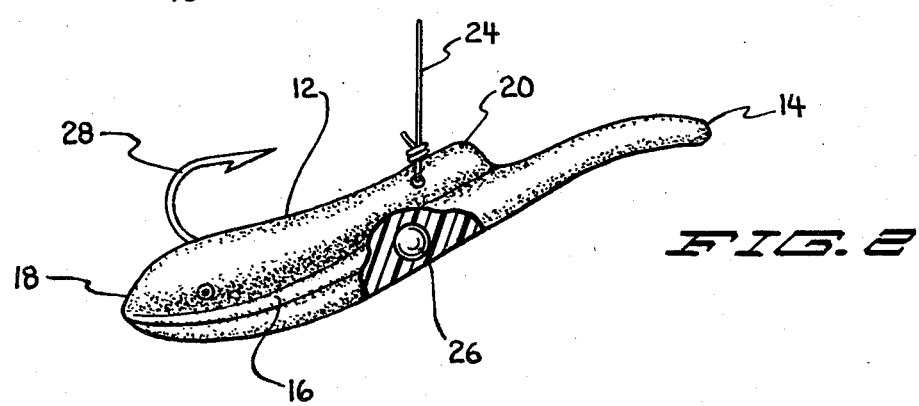

FISHING LURE

BACKGROUND OF THE INVENTION

Artificial lures simulating small bait fish and carrying fish hooks have been used on fishing lines to attract larger fish. Customarily, such lures are used by casting them away from the fisherman and then drawing them in with the use of the fishing line to simulate the movement, or by trolling with them behind a moving boat or the like. In either case, the motion of the lure through the water was primarily in a single direction, thus necessitating that a game fish strike at the lure during a single pass of the lure past the fish. Literally hundreds of lures have been designed to give an action in the water which will simulate the movements of small fish to the fish which it is desired to catch. The great bulk of such movements are achieved with the fishing line extending from the nose or head of the simulated fish of the lure.

Such lures are of little value to a person who wants to do drop line fishing or who is necessarily doing drop line fishing as, for example, when fishing through a hole in the ice. Also, such lures are of little value in attempting to simulate feeding movements of a small bait-size fish in a particular confined area to give the game fish an opportunity to decide that it wants to make a strike.

Before the present invention, lures have been designed to have fish hooks protruding from the simulated back portion of the lure, but such lures did little more than hang in the water suspended from the fishing line, giving an uncoordinated perhaps slightly gliding action as it sank to the bottom and giving a rambling tumbling action when pulled rapidly or slowly up from the bottom.

BRIEF SUMMARY OF THE INVENTION

A fishing lure of the present invention is so constructed that it will glide forward in a relatively flat descent path when allowed to fall through the water; will appear to dart backwards and upwards when jerked mildly upwardly with the fishing line; and will simulate a head foremost, horizontal swimming action when the top of the line is moved horizontally above the surface of the water without any change in the length of the line.

These actions are accomplished by constructing the lure to simulate the shape of a small bait fish. The lure is made from a material which is slightly heavier than water, and includes a dorsal fin, tail fins and side fins. A fishing line is attached to the dorsal fin, and a balancing weight having a density very substantially higher than that of water is situated interiorly of the lure in the bottom half thereof, below the point of fish line attachment and slightly forwardly thereof.

The side fins provide stability for the lure as it travels through the water, and are upswept toward the rear, thus tending to cause the lure to move in forward direction when the tension on the fishing line is released, and tending to hold up the head of the lure. The tail fin is also for the purpose of lending stability to the lure, and has a slight downward sweep toward the rear, tending to counteract the tending of the head to come up as the lure falls free and also contributing to the forward movement of the lure through the water.

The balancing weight is situated near the bottom of the lure and slightly forward of the point of attachment of the fish line to the dorsal fin, and this causes a lure to balance at a sharp downward attitude when it is hanging from the fish line. While hanging at this attitude, a sharp or mild upward tug on the fish line will initially cause the lure to move upward to the rear in alignment with its longitudinal axis, and the downward sweep of the tail and the upward sweep of the side fin will cause that motion to turn into a flatter rearward motion, thus simulating the darting away of a fish when it is frightened or when it is feeding.

The dorsal fin contributes to the stability of the movement of the lure in either forward or rearward direction.

The balance of the balancing weight, the tail fins, the side fins and the rest of the body of the lure is such that when the fishing line is moved in horizontal direction from above the surface of the water, for example, the lure has a weather vaning effect around the dorsal fin connection to the fishing line, and the tail fin swings to the rear and the head swings to the front, thus causing the lure to move through the water in simulation of a horizontal swimming action.

IN THE DRAWINGS

FIG. 1 is a top plan view of the fishing lure of the invention;

FIG. 2 is a side elevational view of the lure with parts in section and parts broken away and showing the attitude of the lure when it is suspended from a fishing line through an opening in its simulated dorsal fin;

FIG. 3 is a composite view to be read from right to left showing the passage of the lure through the water in free fall conditions with the tension suddenly removed from a fishing line; and FIG. 4 is a composite view, to be read from left to right showing the progress of the lure of the invention through the water when the fishing line attached to it is moved sharply in upward direction.

DESCRIPTION OF PREFERRED EMBODIMENT

A fishing lure 10 can simulate a small fish and is to be used to bait larger fish into attacking or striking it due to its appearance and due to its movement in the water. It consists of a body 12 which includes a rearwardly extending tail fin 14, side fins 16, 16, a head 18, and an upwardly extending dorsal fin 20. This dorsal fin is provided with an opening 22 through which a fishing line or leader 24 is attached.

A balancing weight 26 is embedded inside of the body 12 in a position slightly forward of the opening 22 in the dorsal fin, measured along the major longitudinal axis of the lure, and situated adjacent the bottom of the body to provide for the lowest possible center of gravity, and to cause the lure to take on the downward attitute approximately as seen in FIG. 2 when suspended from the line 24.

The body can be made of any suitable easily formed material which is heavier than the water in which it is to be used. Plastic has been found to be excellent for the purpose; but metal stampings would also be satisfactory. The balancing weight will have to be of a material which is substantially heavier than that of the body, and the usual "lead" weight used for fish line sinkers will serve admirably.

In order not to inhibit the action of the lure in the water, it is important that weighted swivels, fasteners, and the like should not be attached adjacent to the lure. If a leader is used to protect against destruction of the fish line by a fish striking at the lure, as is usually the case, this leader should be as flexible as possible commensurate with the size and weight of the lure, and should preferably extend not over 18 inches away from the lure. If a fish line sinker is thought to be necessary, it should not be placed on the fishing line closer to the lure than 18 inches. Any swivels or fasteners should be no closer than 18 inches.

A fish hook 28 is embedded in the body 12 and extends upwardly and rearwardly therefrom.

OPERATION

To use the lure 10 of the invention for drop line fishing from a pier or for winter fishing through a hole in the ice, for example, the lure will be attached, preferably by tying, to a leader or fishing line 24, and can be dropped into the water with the fishing line slacked off so that it does not appreciably control the lure. The lure will appear to swim down toward the bottom on a line straight flattened glide moving from position as seen in the right in FIG. 3, to the intermediate position and will, if allowed to do so by paying out sufficient line, swim into the bottom to position as seen to the left in that figure.

To cause the lure to simulate a small bait fish feeding, the line 24 can be drawn in until the lure is slightly off of the bottom, as seen, for example, to the left in FIG. 4. As soon as the lure clears the bottom, a mild but quick upward tug can be made on the line 24, thus causing the lure tend to dart rearwardly and upwardly, closely simulating the action of a fish that is startled or that is moving away from striking or feeding at some particle in the water. This upward and rearward motion is caused initially, of course, by the fishing line 24 itself, and this immediately causes a planing backward due to the tail fin 14 and the side fins 16, 16. The slight downward sweep to the tail fin tends to cause the tail to move relatively lower than the dorsal fin connection opening at 22, while the slight upward sweep of the side fins 16 tends to bring the fore portion of the body 12 in upward direction, also around the pivot of the opening 22 in the dorsal fin. This translates the initial upward and subsequent rearward movement into even more substantially horizontal rearward movement as the lure moves from the position as seen to the left in FIG. 4, through the position as seen in the middle of that figure to the position as seen to the right. If this tug on the line 24 is not from directly above the longitudinal axis of the lure, there will be a tendency for the lure to also turn on a vertical axis as it darts up and to the rear. Then when the line 24 is again allowed to go slack, the gliding movement as described in connection with FIG. 3 will again take place in the same manner, but in a new direction.

The weight of the forward portion of the body 12 including the side fins 16, and the weight and construction of the tail fin 14 and the rear portion of the body 12 is such that when the fishing line 24 is moved from side to side or in a circular path by the outer end of a fishing rod or by hand, for example, the lure will swing on the lower end of the line like a pendulum, and it will "weather vane" around a vertical axis from the point of attachment opening 22 in the dorsal fin 20 to the balancing weight 26. Thus the weight will always tend to move head first in direction to get directly below the top end of the fishing line. Once the lure is put down on the bottom, and then pulled back up somewhat from the bottom to leave it in the midst of reeds or the like where it would be presumed to simulate feeding of a small bait fish, the fishing line can be moved horizontally either back and forth or round and about, in a figure 8, or in circles, thus to simulate the steady swimming movements of the fish that is being simulated. As just explained, this movement will be substantially entirely with the head moving in the forward direction.

In order to simulate the movement of a small bait fish with the lure, all three of the above described actions can be performed separately. This will make it appear that the small fish which is being simulated by the lure is swimming on a long glide, rapidly darting here and there, and swimming about slowly on a single plane. Various combinations of the three different actions will further aid in simulating a lifelike movement of the small bait fish. For example, by moving the tip of the fishing rod transversely at the same time it is being tugged mildly but quickly upward, the change of direction referred to above at the end of each upward dart can be obtained. Add to this the immediate dipping of the fishing line say about two inches, and the upward rearward dart will be followed by the long glide but in a new direction. By following this action with a transverse movement of the top of the fishing line while in a horizontal plane, a slow simulated feeding action can be obtained. As the lure bumps off of the reeds or stones and rocks on or near the bottom, further changes of directions will take place to further simulate the natural action of small bait-size fishes.

The embodiments of the invention in which an exclusive property or privilege is claimed are defined as follows:

1. A fishing lure having a heavier-than-water body including an upstanding dorsal fin, two side fins protruding outwardly from either side of the body, and a tail fin extending laterally outwardly from the body and rearwardly thereof;
   means on an upper rearward portion of the dorsal fin to receive and retain a fishing line;
   a fish hook permanently mounted in the body; and
   said lure having a center of gravity in the bottom half of the body and slightly forward of the point of connection of the fishing line to the dorsal fin.

2. A fishing lure having a heavier-than-water body including an upstanding dorsal fin, two side fins protruding outwardly from either side of the body, and a tail fin extending rearwardly thereof;
   means on an upper rearward portion of the dorsal fin to receive and retain a fishing line;
   a balancing weight of substantially higher specific gravity than that of the lure body, said weight being embedded in a bottom portion of the body adjacent to the point of connection of the fishing line to the dorsal fin, but on the side of the fishing line toward the head of the lure; and
   a fish hook permanently mounted in the body.

3. The fishing lure of claim 2 wherein the center of gravity of the lure is such that it hangs from the fishing line, when both are at rest, with a front or head portion of the lure below the tail fin thereof.

4. The fishing lure of claim 3 wherein the hook is permanently mounted in an upper forward portion of the lure and extends therefrom so that the point of the hook is facing rearwardly.

5. The fishing lure of claim 4 wherein the tail fin has a slight downward sweep tending to lower the tail in the water when the lure is moving to the rear and tending to raise the tail in the water when the lure is moving forward, and wherein the side fins have a slight upward sweep to the rear, thus tending to support the front end of the lure for downward movement when the lure moves in a forward direction and tending to support and raise the front end of the lure when the lure is traveling in rearward direction.

* * * * *